United States Patent
Burns et al.

(10) Patent No.: US 7,062,387 B1
(45) Date of Patent: Jun. 13, 2006

(54) METHOD AND APPARATUS FOR LEAK DETECTION IN LOW DENSITY GAS-FILLED DISK DRIVES

(75) Inventors: Robert Steven Burns, Worcester, MA (US); Padmanabhan Srikrishna, Acton, MA (US); James Fitzpatrick, Sudbury, MA (US); Jason Henry, Sterling, MA (US); Ken DelPapa, Natick, MA (US)

(73) Assignee: Maxtor Corporation, Longmont, CO (US)

( * ) Notice: Subject to any disclaimer, the term of this patent is extended or adjusted under 35 U.S.C. 154(b) by 37 days.

(21) Appl. No.: 10/848,476

(22) Filed: May 17, 2004

(51) Int. Cl.
   *G01F 17/00* (2006.01)
   *G01N 25/72* (2006.01)

(52) U.S. Cl. .............................. 702/51; 702/50; 374/4

(58) Field of Classification Search ................ 702/51, 702/50, 35, 36; 360/97.01, 97.02; 374/4
   See application file for complete search history.

(56) References Cited

U.S. PATENT DOCUMENTS

| | | | |
|---|---|---|---|
| 5,282,100 A | 1/1994 | Tacklind et al. | 360/97.02 |
| 5,454,157 A | 10/1995 | Ananth et al. | 29/603 |
| 5,666,243 A | 9/1997 | Brent | 360/106 |
| 5,784,296 A | 7/1998 | Baker et al. | 364/551.01 |
| 6,178,059 B1 | 1/2001 | Frees | 360/75 |
| 6,222,375 B1 | 4/2001 | Fitzpatrick et al. | 324/601 |
| 6,392,838 B1 | 5/2002 | Hearn et al. | 360/97.02 |
| 6,567,235 B1 | 5/2003 | Kasetty et al. | 360/97.01 |
| 6,631,053 B1 | 10/2003 | Chew | 360/265.7 |
| 6,678,102 B1 | 1/2004 | Liikanen et al. | 360/31 |
| 6,876,515 B1* | 4/2005 | Unno | 360/97.02 |
| 2003/0007280 A1 | 1/2003 | Bernett et al. | 360/77.02 |
| 2003/0026033 A1 | 2/2003 | Fioravanti et al. | 360/75 |
| 2003/0081349 A1 | 5/2003 | Bernett | 360/97.02 |
| 2003/0089417 A1 | 5/2003 | Bernett | 141/65 |
| 2003/0090832 A1 | 5/2003 | Bernett et al. | 360/97.02 |
| 2003/0172520 A1 | 9/2003 | Liu et al. | 29/603.03 |
| 2003/0179489 A1 | 9/2003 | Bernett et al. | 360/97.01 |
| 2003/0202276 A1 | 10/2003 | Smith | 360/97.02 |
| 2004/0216514 A1* | 11/2004 | Nunnally et al. | 73/40 |

OTHER PUBLICATIONS

U.S. Appl. No. 10/055,237, filed Oct. 24, 2001, Marshall et al.
U.S. Appl. No. 10/266,436, filed Oct. 8, 2002.
U.S. Appl. No. 10/839,608, filed May 4, 2004, deJesus et al.

(Continued)

*Primary Examiner*—Bryan Bui
*Assistant Examiner*—Meagan S Walling
(74) *Attorney, Agent, or Firm*—Sheridan Ross P.C.

(57) ABSTRACT

The present invention is directed to the detection of gas leaks from a gas-filled disk drive. In accordance with embodiments of the present invention, gas leaks from a disk drive can be detected by monitoring certain disk drive parameters. Furthermore, different types and instances of disk drive parameters may be monitored. No or few additional hardware components are required to be added to a disk drive in connection with implementing embodiments of the present invention.

43 Claims, 9 Drawing Sheets

OTHER PUBLICATIONS

U.S. Appl. No. 10/839,611, filed May 4, 2004, Gifford et al.
U.S. Appl. No. 10/839,548, filed May 4, 2004, Andrikowich et al.
U.S. Appl. No. 10/839,606, filed May 4, 2004, Andrikowich et al.
U.S. Appl. No. 10/839,685, filed May 4, 2004, Andrikowich et al.
U.S. Appl. No. 10/860,626, filed Jun. 2, 2004, Mann et al.
IBM Corp., "Seal for a Hermetically Sealed Disk File," IBM Technical Disclosure Bulletin, vol. 27, No. 11 (Apr. 1985).

* cited by examiner

METHOD AND APPARATUS FOR LEAK DETECTION IN LOW DENSITY GAS-FILLED DISK DRIVES

FIELD OF THE INVENTION

The present invention is related to low density gas-filled disk drives. In particular, the present invention is directed to the detection of leaks in low density gas-filled disk drives.

BACKGROUND OF THE INVENTION

Hard disk drives incorporate magnetic storage disks and read/write heads which are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly which positions the heads relative to the surface of the storage disks. This may be at a predetermined height above the corresponding storage disk. The actuator assembly is typically controlled by a voice coil motor which acts to position the slider over the desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to eight or more hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrow. However, decreasing the width of tracks makes it more difficult for the read/write heads to accurately read and write information to and from the tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely affect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR.

Accuracy can be further adversely affected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. In particular, because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals used in disk drives between the base plate and cover are designed to prevent contaminants from entering the drive. Such seals are not designed to prevent internal air and other gases from exiting through the seal and out of the drive. Loss of gas through the seals is anticipated and accommodated by use of a filtered port to maintain air pressure within the drive at the pressure of the air outside of the drive.

As an alternative to air-filled drives, advantages may be achieved by filling disk drives with gases having a lower density than air. For example, Helium has a lower density than air at similar pressures and temperatures and can enhance drive performance. When compared with air, lower density gases can reduce aerodynamic drag experienced by spinning disks within the drive, thereby reducing power requirements for the spindle motor. A Helium-filled drive thus uses substantially less power than a comparable disk drive that operates in an air environment. Relatedly, the reduction in drag forces within the Helium filled drive reduces the amount of aerodynamic turbulence that is experienced by the drive components such as the actuator arms, the suspensions and the heads. Reduction in turbulence allows drives filled with low density gas to operate at higher speeds compared with air-filled drives, while maintaining the same flying height and thereby maintaining the same range of read/write errors. Low density Helium drives also allow for higher storage capacities through higher recording densities due to the fact that there is less turbulence within the drive, which allows the tracks to be spaced more closely together.

In order to maintain the gas in the drive, low density Helium drives must be permanently sealed. Accordingly, there is no filtered port to equalize pressure within the drive as with air-filled drives. As a result, the seal between the cover and base plate must prevent leakage and maintain a threshold level of low density gas within the sealed environment over the expected lifetime of the drive. However, light or low density gases are difficult to contain within a disk drive enclosure due to diffusion of the gas and problems with sealing the drive. Therefore, it is difficult to prevent the low density gas from escaping from the sealed drive environment. Gas that is lost may or may not be replaced with ambient air. In either case, the performance of the drive will change from the design specifications, namely, a low density Helium sealed environment. For example, as a result of low density gas leaks from the drive, the flying height of the heads is altered, increasing the likelihood of data loss.

If the low density gas leaks out of a drive and is replaced by air, the increased concentration of air may increase the turbulent forces on the heads due to the increased drag forces within the drive and may cause the heads to fly at too great a distance above the disks, thereby increasing instances of read/write errors. The replacement of a light gas with air also increases the amount of power required by the spindle motor to rotate the disks, because of the resulting increase in aerodynamic drag. If the light gas leaks from the drive and is not replaced by air, the heads may fly at a distance too close or in contact with the disks, thereby increasing instances of read/write errors as well as damage to the disk surface and head and data loss due to contact between the disk and head (i.e., head crashes). The risk of unanticipated failure due to inadequate amounts of low density gas within the drive is a drawback to low density Helium drives. Indeed, data stored within the drive may be irretrievably lost if the drive fails due to the loss of the low density gas environment.

SUMMARY OF THE INVENTION

The invention relates to the detection of leaks in low density gas-filled disk drives. As used herein, a low density gas is a gas having a density that is lower than air. In particular, embodiments of the present invention allow leaks in gas-filled disk drives to be detected using features or components that may be normally included as part of a disk drive. That is, embodiments of the present invention allow for the detection of leaks in gas-filled disk drives without requiring additional hardware components. Accordingly, embodiments of the present invention allow a signal indicating the loss of gas from the interior of a hard drive to be generated, with little or no increase in the cost and complexity of the disk drive in order to provide such a signal. In accordance with other embodiments of the present invention, simple hardware components may be added.

In accordance with embodiments of the present invention, a method for detecting gas leaks in connection with gas-filled disk drives includes monitoring one or more drive parameters. Such drive parameters may be monitored by or available to a controller component associated with a disk drive for purposes that may include various operating functions in addition to determining whether a gas has leaked from the disk drive enclosure. Monitored parameters may include read/write quality indicators, transducer head positioning accuracy, read signal strength, spindle motor power or current requirements, disk drive component temperatures, head disk assembly temperature, voice coil motor resistance, and transducer head fly height.

In accordance with further embodiments of the present invention, a determination as to whether gas has leaked from the disk drive without being replaced by air, or has leaked from the disk drive and been replaced by air, can be made. In particular, the nature of a change in a monitored parameter may be used to make such a distinction. For instance, an improvement in a read/write quality factor may indicate that gas has leaked from the drive without being replaced by air, while a decrease in a read/write quality factor may indicate that gas has leaked and been replaced by air. As a further example, an improvement in transducer head positioning accuracy may indicate that gas has leaked from the disk drive without being replaced by air, while a degradation of transducer head positioning accuracy may indicate that gas has leaked from the disk drive and been replaced by air. The amount of power required by the spindle motor in order to maintain the disks at the desired rotating velocity may also be used to make such a distinction. In particular, a decrease in the spindle motor power requirement may be taken as an indication that gas has leaked from the drive and not been replaced by air, while an increase in the spindle motor power requirement may be taken as an indication that gas has leaked from the disk drive and been replaced by air. As another example, if a fly height sensor indicates that the fly height of a transducer head has decreased, it may be taken as an indication that gas has leaked from the disk drive and not been replaced by air, while an output from a fly height sensor indicating that the fly height of a transducer head has increased may be taken as an indication that gas has leaked from the disk drive and been replaced by air. As still another example, if a resistance associated with a voice coil motor increases, it may be taken as an indication that gas has leaked from the disk drive.

In accordance with embodiments of the present invention, different read/write quality factors or indicators may be monitored in connection with detecting the loss of a gas from a disk drive. Such quality indicators may include a mean square error and a sequence amplitude margin.

According to embodiments of the present invention, a number of disk drive parameters are monitored, and a determination as to whether gas is leaking from the disk drive is made based on more than one of those parameters. In accordance with further embodiments of the present invention, different disk drive parameters are weighted differently in determining whether a gas has leaked from the disk drive. The particular weighting assigned to different disk drive parameters may be derived empirically from the observed effect on monitored disk drive parameters in a particular disk drive design or type in response to a loss of gas from the disk drive with replacement by air and/or the loss of gas from the disk drive without replacement by air. In accordance with still other embodiments of the present invention, disk drive parameters associated with a number of transducer heads within a disk drive may be monitored to provide an indication that gas has leaked from the drive. For example, the flying height of all or a number of transducer heads included in a multiple head disk drive may be monitored, and a signal indicating that gas has leaked from the disk drive is generated if a change in the flying height of all of the monitored transducer heads, or of a selected minimum number of transducer heads, is observed. Similarly, read/write quality indicators, positioning accuracy, or read signal strength for all or a number of transducer heads in a multiple head disk drive may be monitored to provide an indication that gas has leaked from the disk drive.

In accordance with embodiments of the present invention, action may be taken based on a determination that gas has leaked from a disk drive. For example, if a gas leak is detected, a user or administrator of a device incorporating or associated with the disk drive may be notified, so that an attempt to remove data from the disk drive can be made, before total failure of the drive. As a further example, if a loss of gas and replacement of that gas by air is detected, a data recovery mode may be entered in which the rotational velocity of the data storage disks is reduced, thereby reducing the flying height of associated transducer heads, allowing data to be read from the disk drive before failure.

In accordance with embodiments of the present invention, a gas-filled hard disk drive capable of providing an indication that gas has leaked from the drive is provided. The hard disk drive may include a controller receiving one or more signals related to disk drive operating parameters. Based on such signals, the controller may generate a signal indicating that a gas that occupied an interior of the disk drive has leaked or is leaking from the disk drive. In order to monitor such parameters, the controller may receive or monitor signals such as signals related to read/write performance quality indicators, the amount of gain applied to read signals by a variable gain amplifier, the amount of power or current supplied to a spindle motor, the temperature of one or more components within the disk drive, the temperature of the head disk assembly, the temperature within the head disk assembly cavity of the disk drive, and the output from a harmonic or other type of transducer flying height sensor.

DETAILED DESCRIPTION

Figure 1:
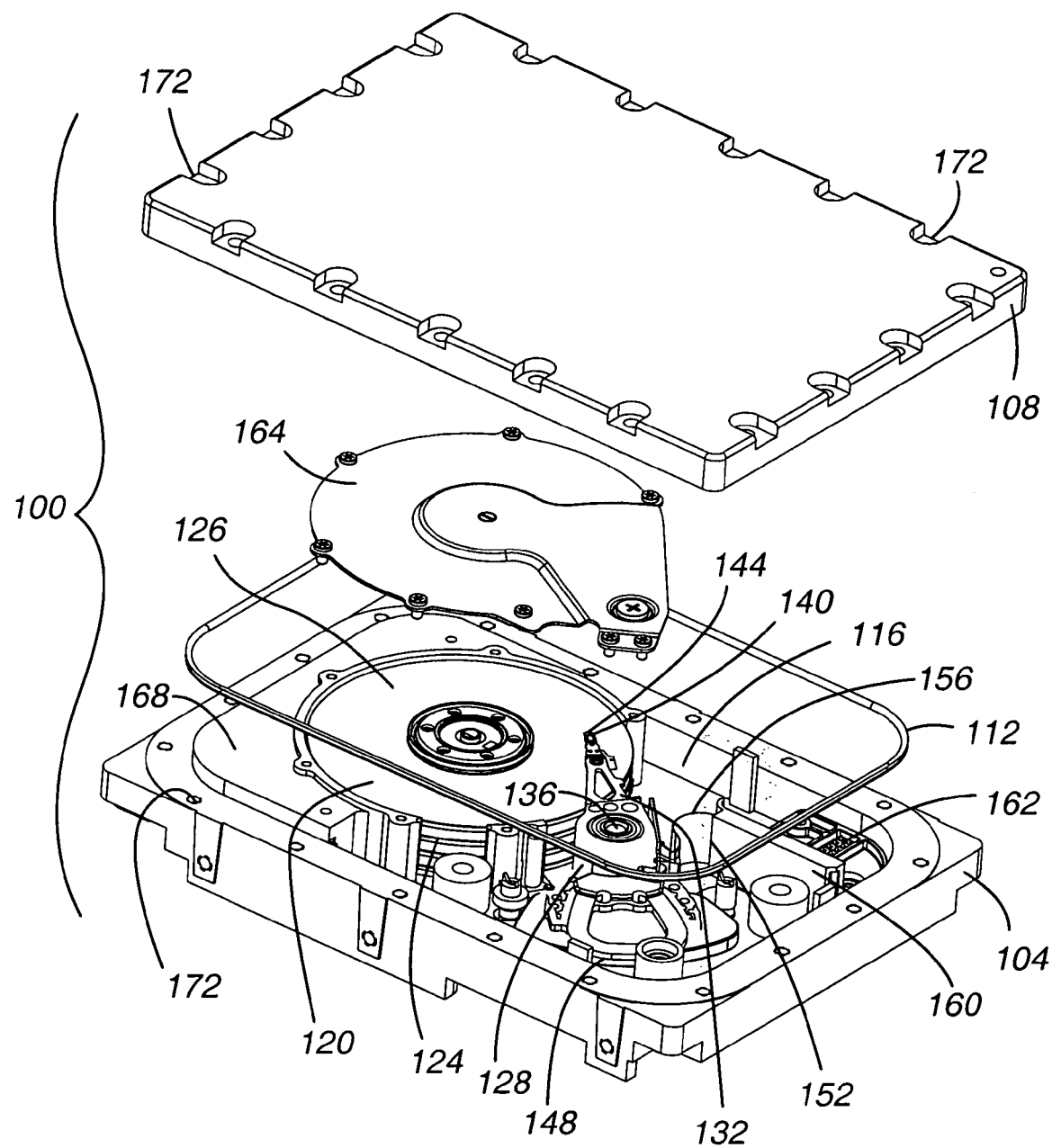
FIG. 1 is an exploded view depicting components of a hard disk drive in accordance with an embodiment of the present invention.

With reference now to FIG. 1, components of a hard disk drive 100 in accordance with embodiments of the present invention are shown in an exploded view. In general, the hard disk drive 100 includes a base plate 104 and a cover 108. In addition, embodiments of the present invention include a seal 112 to inhibit the leakage of a gas contained in a head disk assembly cavity 116 when the cover 108 is interconnected to the base plate 104. In general, the base plate 104, the cover 108, and the seal 112 comprise the disk drive 100 enclosure.

The hard disk drive 100 additionally includes a disk stack 120 that includes a number of storage disks 124, each having one or two recording surfaces 126. The storage disks 124 of the disk stack 120 are interconnected to the base plate 104 by a spindle bearing 212 (see FIG. 2). A spindle motor 216 (see FIG. 2) may be integral to or associated with the spindle bearing to rotate the disks 124 relative to the base plate 104. In operation, the spindle motor 216 typically is operated to maintain the disks 124 at a selected rotational velocity.

An actuator assembly 128 having one or more actuator arms 132 is mounted to the base plate 104 at an actuator shaft 136. Each actuator arm 132 is associated with a slider 140 and transducer head or read/write head 144. A voice coil motor 148 operates to move the actuator arms 132 about the actuator shaft 136 to allow the transducer heads 144 to access different data tracks on the storage disks 124. In general, one actuator arm 132 and associated slider 140 and transducer head 144 is provided for each disk surface included in the disk stack 120.

As can be appreciated by one of skill in the art, data may be stored on the surfaces 126 of the disks 124 as a series of magnetic transitions. Signals derived from such magnetic transitions by the transducer heads 144, and signals provided to the transducer heads 144 to create magnetic transitions on the disks 124 and thereby write data, are passed along a channel 152. As shown in FIG. 1, the channel 152 may comprise a flex circuit 156 and a channel preamplifier 160.

As can further be appreciated by one of skill in the art, the hard disk drive 100 may include a printed circuit board mounted on a side of the base plate 104 opposite the cavity 116. A conductor opening 160 may therefore be provided for allowing conductors to pass between the head disk assembly cavity 116 and the printed circuit board. In accordance with embodiments of the present invention, the conductor opening 160 can be sealed so that, when the cover 108 is fixed to the base plate 104, a light or low density gas may be maintained within the cavity 116.

The disk drive 100 may include various other components, such as a capture plate 164 and a perimeter wall 168. Threaded and/or unthreaded fastener holes 172 may also be provided to receive fasteners (not shown) to secure the cover 108 to the base plate 104.

Figure 2:
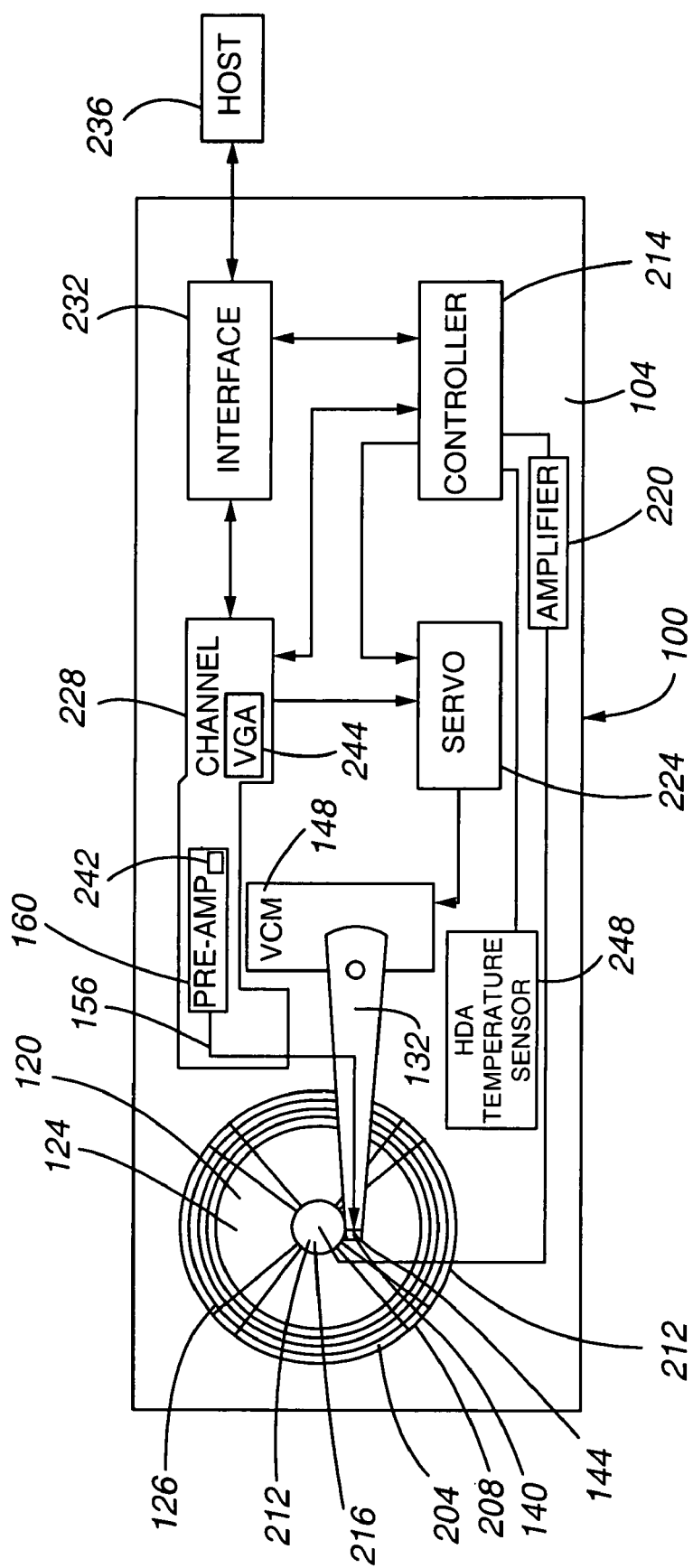
FIG. 2 is a block diagram depicting components of a hard disk drive in accordance with embodiments of the present invention.
Figure 3:
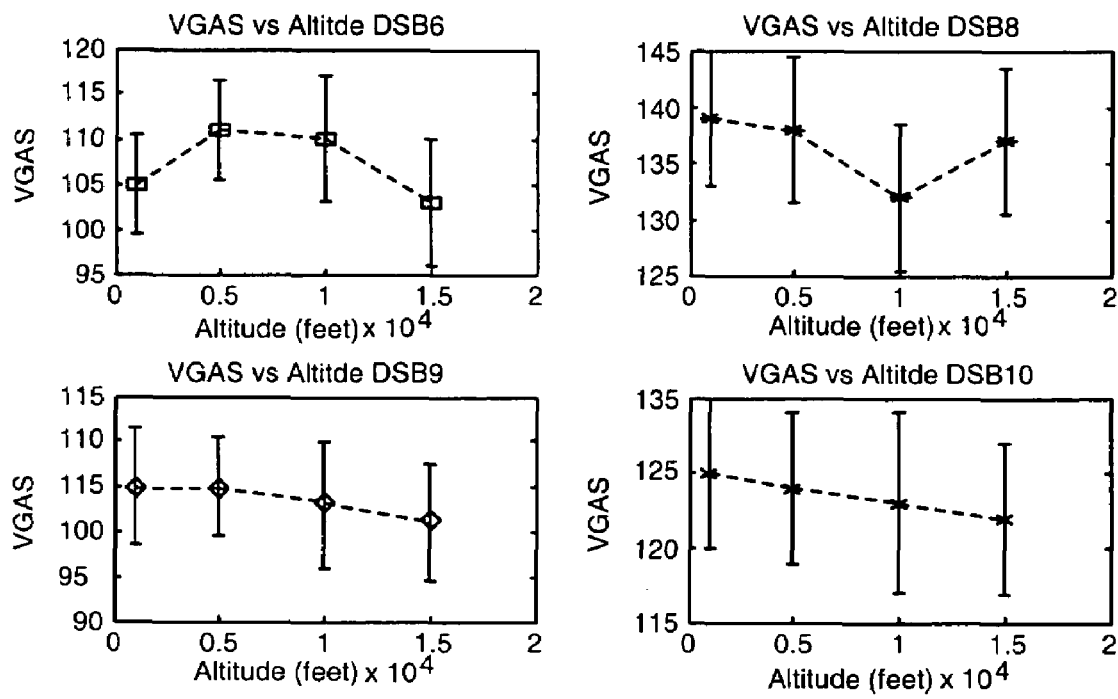
FIG. 3 illustrates the relationship between variable gain amplifier output and Helium pressure in exemplary hard disk drives.

With reference now to FIG. 2, components of a hard disk drive 100 in accordance with embodiments of the present invention are depicted in block diagram form. As seen in FIG. 2, a number of concentric tracks 204 are formed on the surfaces 126 of each disk 124 included in the disk stack 120. Also shown in FIG. 2 is the division of tracks 204 into servo sectors 208 and data sectors 212. Although the servo sectors 208 and data sectors 212 are depicted in FIG. 2 as wedges radiating from the center of the disk 124, it should be appreciated that such an arrangement is not required. Accordingly, alternate embodiments may have different arrangements of servo sectors 208 and data sectors 212. In addition, although the tracks 204 are shown as concentric tracks, it should be appreciated that other configurations are possible. For example, data may be written in one or more spiraling tracks, rather than in concentric tracks.

The hard disk drive 100 generally includes a controller 214 for performing various functions in connection with operation of the hard disk drive 100. In accordance with an embodiment of the present invention, the controller 214 controls the rotational velocity of the storage disks 124 by supplying a pulse-width modulated code that is amplified by a power amplifier 220 and provided to the spindle motor 216. In addition, the controller 214 controls the position of the transducer heads 144 with respect to the data tracks 204 by controlling the voice coil motor 148 in cooperation with a servo 224. The controller 214 also controls functions of the channel or read/write channel 228. Information related to operating parameters associated with channel 228 components is also provided to the controller 214. The controller 214 is also interconnected to an interface 232 that interfaces the disk drive 100 to a host computer or network 236. In accordance with embodiments of the present invention, the controller 214 may comprise a programmable processor capable of running firmware or software instructions loaded into or stored on memory included in or accessible to the controller 214. Furthermore, as will be described in greater detail elsewhere herein, the controller 214 is, in accordance with embodiments of the present invention, capable of executing instructions associated with the detection and notification of a leak of gas from the cavity 116 of the disk drive 100.

As shown in FIG. 2, the channel 228 may include a channel preamplifier 160 and a variable gain amplifier 244. In general, the preamplifier 160 operates to amplify signals derived from data stored as magnetic transitions in the data tracks 204 by a transducer head 144. In accordance with embodiments of the present invention, the channel preamplifier 160 is located within the head disk assembly cavity 116. In accordance with further embodiments of the present invention, a preamplifier temperature sensor 242 may be attached to or integrated into the silicon die of the preamplifier 160. The channel 228 may additionally include a variable gain amplifier 244. In general, the variable gain amplifier 244 may operate to provide a normalized or near normalized signal strength in connection with signals derived from user data or other information stored on the storage disks 124 as magnetic transitions.

The controller 214 may also receive signals from sensors. Such sensors may include a head disk assembly temperature sensor 248. In accordance with embodiments of the present invention, the temperature sensor may be located within the head disk assembly cavity 116. For example, a temperature sensor 248 may be mounted on the flex circuit 156. In accordance with alternative embodiments of the present invention, the head disk assembly temperature sensor 248 may be located outside of the hard disk assembly cavity.

By filling the head disk assembly cavity 116 with a light or low density gas, such as Helium, various performance aspects of the hard disk drive 100 can be improved. For example, aerodynamic turbulence between the surfaces 126 of the disks 124 and the sliders 140 is reduced. This reduction in aerodynamic turbulence reduces position errors between the transducer heads 144 and data tracks 204. In addition, the reduced aerodynamic drag experienced by spinning disks 124 as compared to air filled disk drives reduces the power requirements of the spindle motor 216. Furthermore, the reduced turbulence and reduced aerodynamic drag could allow the disks 124 to be rotated at higher velocities as compared with air filled drives, while maintaining the same flying height, and thereby maintaining the same range of read/write errors. In addition, the increased positioning accuracy provided by low density gas-filled drives can allow data densities on the disks 124 to be increased as compared to air filled drives.

The loss of a low density gas from the head disk assembly cavity 116 of a disk drive 100 designed to operate with the light gas, rather than air, can adversely affect the performance of the disk drive. For example, if a light gas leaks from the hard disk drive 100 and is not replaced by air, the flying height of the transducer heads 144 with respect to the disk surfaces 126 is reduced. As a result, contact between transducer heads 144 and disk surfaces 126 (i.e., head disk crashes) become more likely. Such contact can result in permanent damage to heads 144 and disks 124, and may result in permanent data loss. Another effect of a loss of light gas without replacement by air is an improvement in read/write quality functions, such as mean square error and sequence amplitude margin observed in connection with read/write operations. The improvement in such quality functions is a result of the decreased separation between transducer heads 144 and disk surfaces 126. Still another result of a leak without replacement by air is a decrease in the amount of power required by the spindle motor 216 to maintain the disks 124 at the normal rotational velocity. The position error signal (PES) may also decrease. In addition, the temperatures of components located within the head disk assembly cavity 116, such as the channel preamplifier 240, and the temperature within the head disk assembly cavity 116 itself, may increase.

If a light gas leaks from the interior of the hard disk drive 100, and in particular from the head disk assembly cavity 116, and is replaced with atmospheric air, the flying height of the transducer heads 144 with respect to the disk surfaces 126 will increase. In addition, as a result of the increased flying height, quality functions associated with transducer heads 144 will deteriorate. For example, the mean square error and the sequence amplitude margin observed in connection with read operations will increase. In addition, the amount of power required by the spindle motor 216 to maintain the disks 124 at the normal rotational velocity will increase, because of the increased turbulence and drag as compared to a light gas-filled atmosphere. In addition, the temperature of components within the head disk assembly cavity 116, such as the channel preamplifier 240 and the temperature of the head disk assembly cavity 116 itself will increase, due to the decreased efficiency with which atmospheric air transports heat as compared to a light gas. An increase in temperature can be detected in various ways, such as directly by a temperature sensor 248, or indirectly, such as by an increase in the resistance of the voice coil motor 148. In addition, the position error measurements, for example as represented by position error signals, tend to worsen.

Various of these phenomenon are illustrated in FIGS. 3–9. In particular, in FIG. 3, the relationship between the output from a variable gain amplifier as a function of altitude (Helium gas pressure) in four different example disk drives are shown in corresponding graphs 300a–d. In the graphs 300a–d, a trend towards decreased variable gain amplifier gain amount as altitude increases (i.e., Helium pressure decreases) can be discerned. However, it will be noted that some variance in this relationship is also evident. Therefore, as can be appreciated from the present disclosure, embodiments of the present invention may monitor a number of disk drive parameters in connection with determining whether a leak is present in a disk drive.

Figure 4:
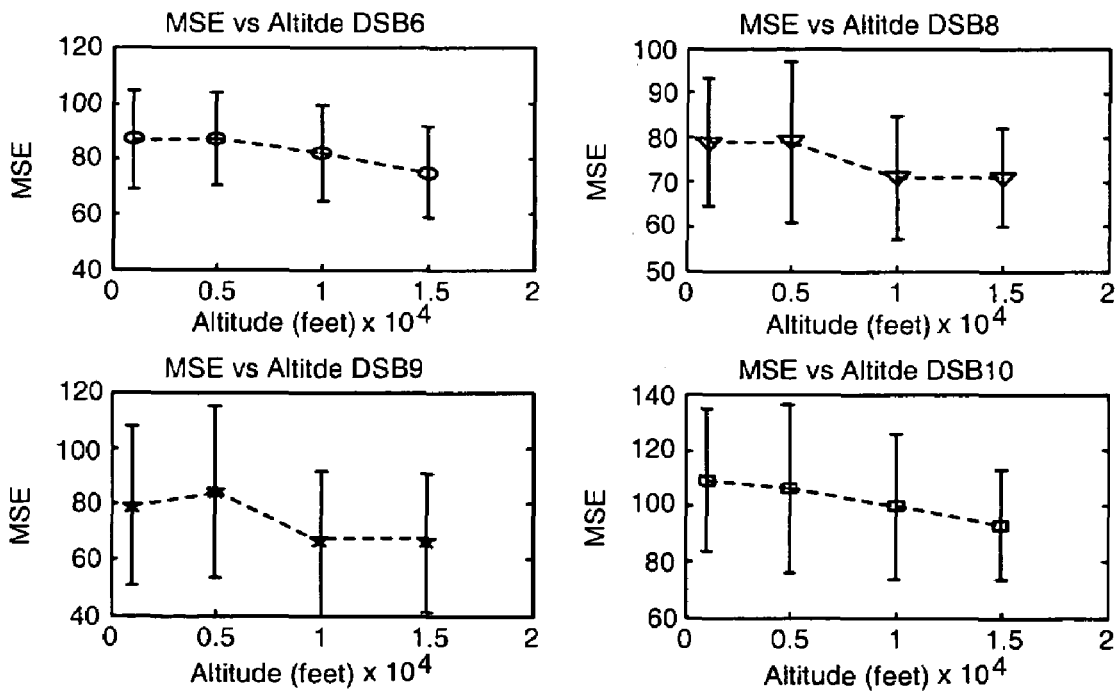
FIG. 4 illustrates the relationship between mean square error and Helium pressure in exemplary hard disk drives.

With reference now to FIG. 4, the relationship between an observed mean square error and altitude (i.e., Helium gas pressure) for four different hard disk drives are shown in corresponding graphs 400a–d. From the data illustrated by the graphs 400a–d, a decrease in mean square error as altitude increases (i.e., Helium pressure decreases) can be discerned. Again, some variance can be discerned in the data, therefore embodiments of the present invention may track additional parameters in connection with monitoring a disk drive to determine whether a leak has developed.

Figure 5:
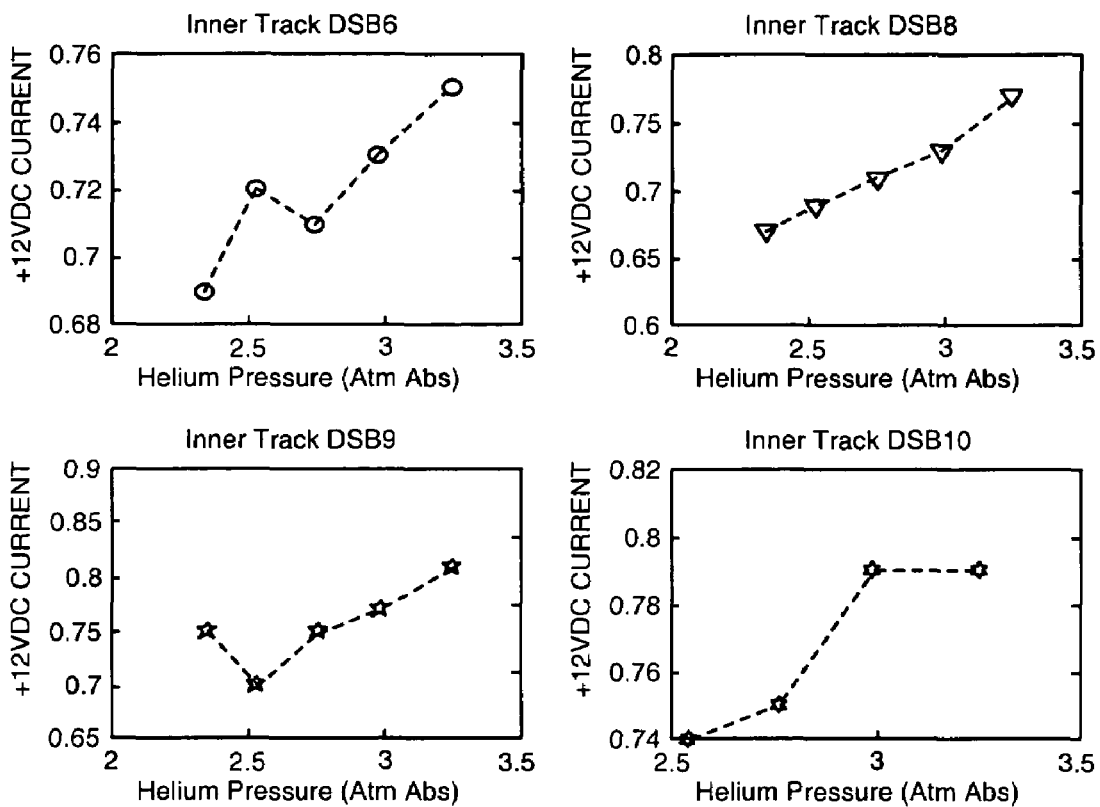
FIG. 5 illustrates the relationship between spindle motor current while a transducer head is following an inner track versus Helium pressure in exemplary hard disk drives.
Figure 6:
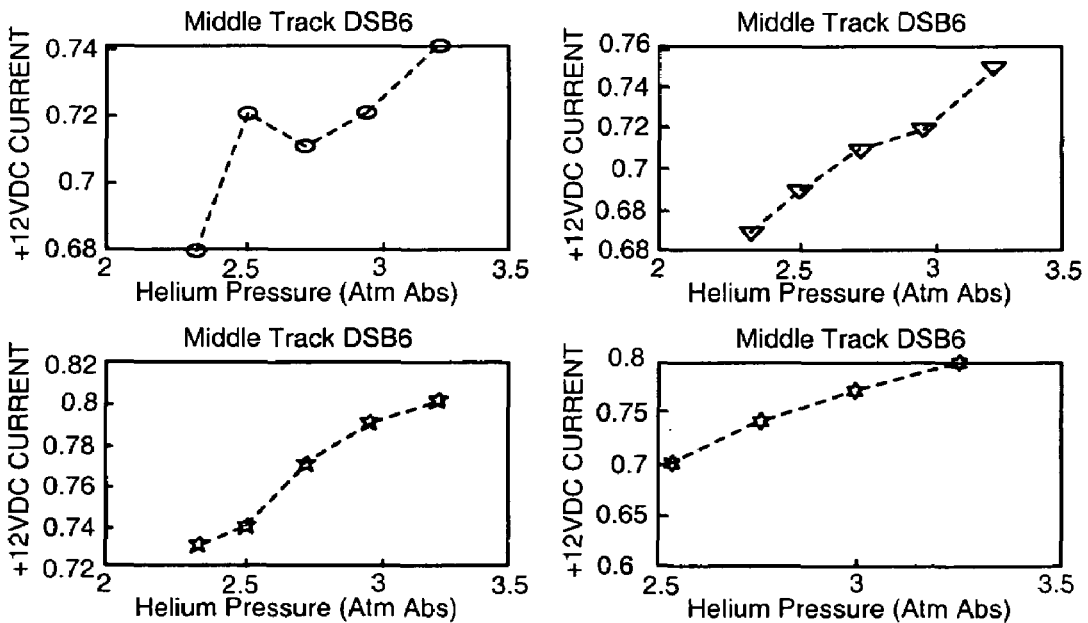
FIG. 6 illustrates the relationship between spindle motor current while a transducer head is following a middle track and Helium pressure in exemplary hard disk drives.
Figure 7:
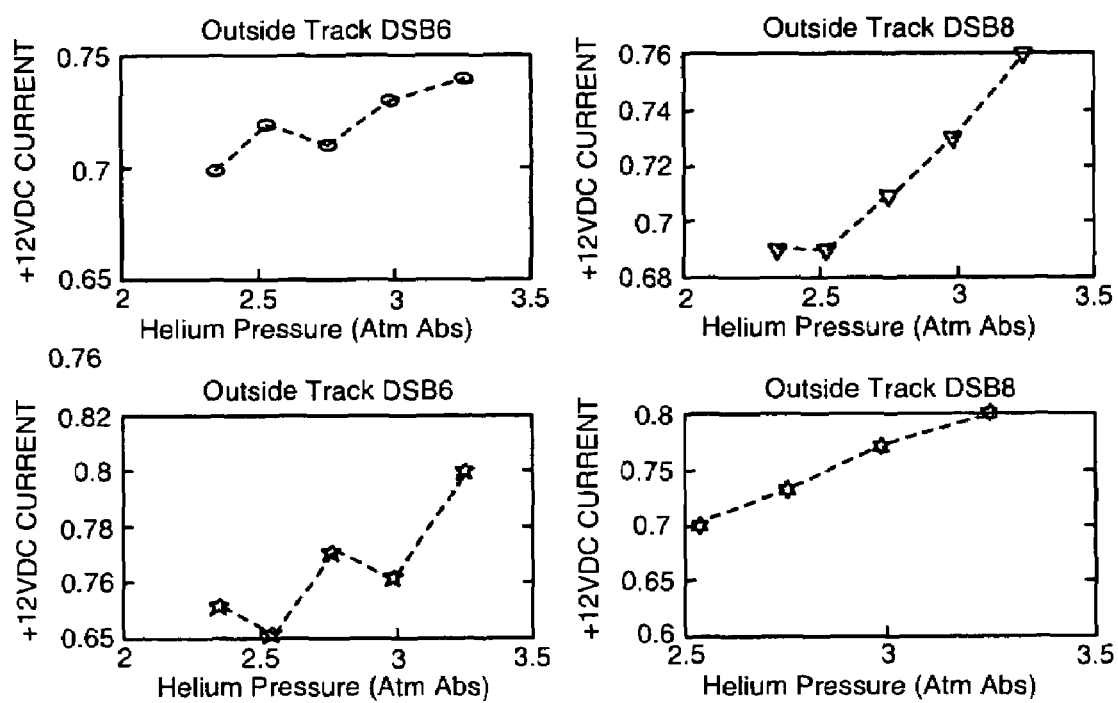
FIG. 7 illustrates the relationship between spindle motor current while a transducer head is following an outside track and Helium pressure in exemplary hard disk drives.

With reference now to FIGS. 5, 6 and 7, the relationship between spindle motor power requirements and Helium gas pressure in four different disk drives is illustrated. In particular, FIG. 5 illustrates the power requirement for the different disk drives in graphs 500a–d while an inner track is being followed, FIG. 6 illustrates the power requirement of the spindle motor for the disk drives in graphs 600a–d while a middle track is being followed, and FIG. 7 illustrates the spindle motor power requirement for the disk drives in graphs 700a–d while an outside track is being followed. In general, the graphs 500a–d, 600a–d, and 700a–d show a trend toward increased spindle motor power requirements with increased Helium pressure. As will be noted from a review of the data depicted in FIGS. 5–7, the relationship between spindle motor power requirements and the pressure of the light gas varies. Spindle power vs. helium pressure is a very monotonic relationship. Variation in the data was due to helium pressure measurement error. Therefore, embodiments of the present invention advantageously monitor other disk drive parameters in addition to spindle motor power requirements.

Figure 8:
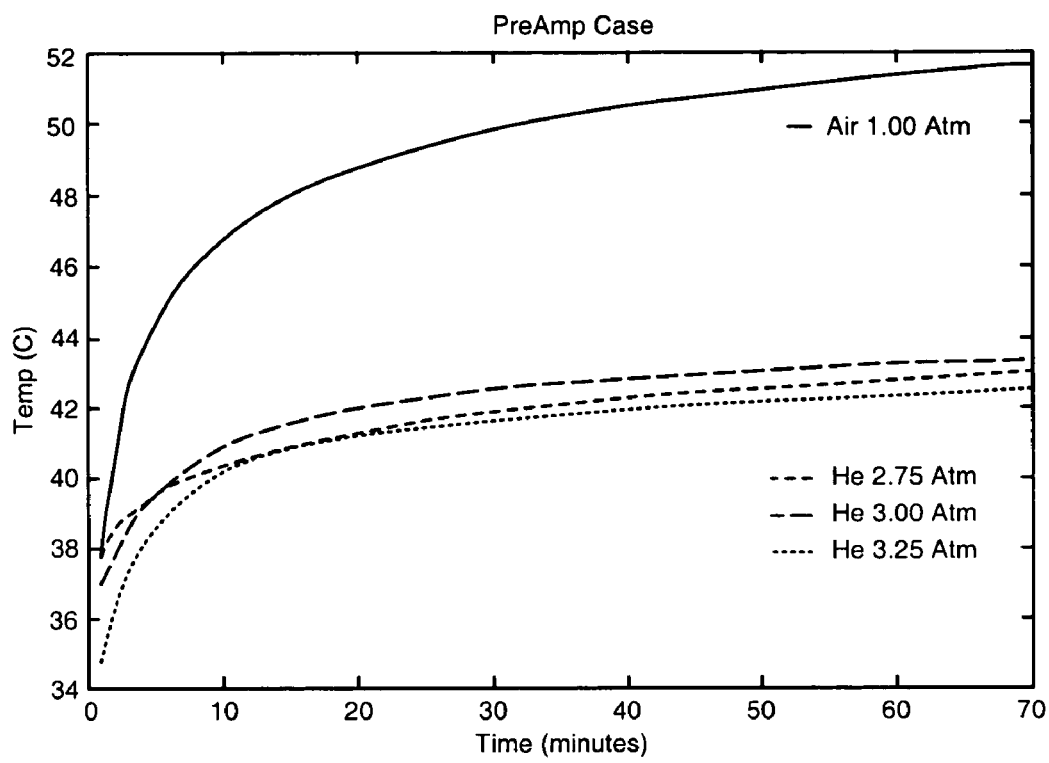
FIG. 8 illustrates channel preamplifier temperatures versus time in exemplary hard disk drives.
Figure 9:
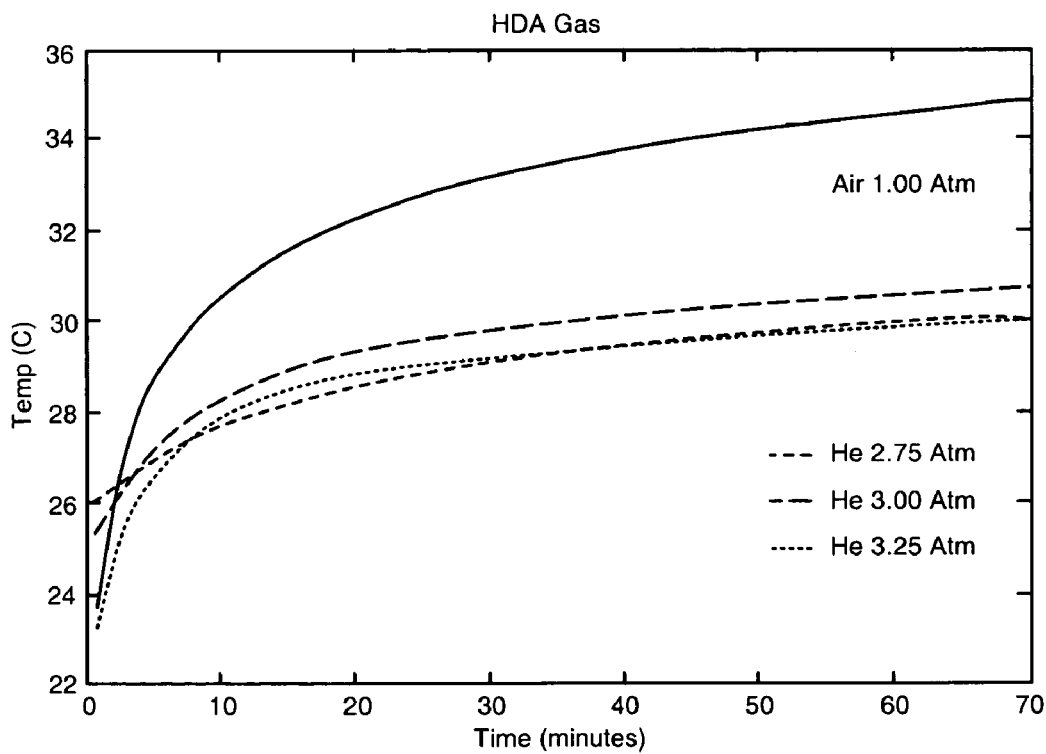
FIG. 9 illustrates head disk assembly cavity gas temperature over time for exemplary hard disk drives.

With reference now to FIGS. 8 and 9, the relationship between temperatures within a disk drive over time in different environments is depicted. In particular, FIG. 8 illustrates the temperature of a preamplifier case in a disk drive in the presence of air at atmospheric pressure (line 800), in the presence of Helium at a pressure of 2.75 atmospheres (line 804), in the presence of Helium at a pressure of 3 atmospheres (line 808) and in the presence of Helium at a pressure of 3.25 atmospheres (line 812). As shown in FIG. 8, the temperature of a preamplifier in a disk drive (e.g., of a preamplifier 160 located within a cavity 116) can be expected to be higher in an environment consisting of air than in a Helium filled environment. In addition, the temperature of the preamplifier may be higher at lower pressures of Helium. Similarly, in FIG. 9, graphs of the temperature within a head disk assembly cavity in different environments shows that the temperature is greater in one atmosphere of air (line 900) than in an atmosphere consisting of Helium (lines 904–912). The higher temperatures experienced in an atmosphere consisting of air as compared to an atmosphere consisting of Helium is due to the fact that Helium is a more efficient convection gas, as the lighter Helium atom can carry away more kinetic energy (i.e., heat) per collision with the preamplifier case or other components in the head disk assembly cavity. Therefore, preamplifier case temperature and head disk assembly cavity temperature can be used to detect a leak of Helium from a disk drive.

The monitoring and detection of changes in transducer head 144 flying height with respect to the surfaces 126 of disks 124 can be determined in various ways. For example, a harmonic sensor, such as is described in U.S. Pat. Nos. 5,784,296 and 6,222,375, the entire disclosures of which are hereby incorporated herein by reference, may be used to determine the flying height of a transducer head 144 or to detect changes in the flying height of a transducer head 144. In general, a harmonic sensor operates by performing a spectral analysis of recorded signals. Another technique for measuring the flying height of a transducer head 144 monitors the observed amplitude of automatic gain control fields embedded in tracks 204 of disks 124. Still another method for determining the flying height of transducer heads 144 detects changes in the amplitude of signals derived from servo sector position bursts written to tracks 204 of the disks 124, such as is described in U.S. Pat. No. 6,678,102, the entire disclosure of which is hereby incorporated herein by reference. As can be appreciated by one of skill in the art, increased flying height also results in a reduced signal to noise ratio in the playback signal for each head in the drive, which affects mean square error (MSE) and sequence amplitude margin (SAM). Yet another technique for determining the flying height of a transducer head 144 with respect to a disk surface 126 makes use of the Wallace Spacing Loss formula, written as $V_{playback}(f)=G(f)*exp(-2\pi*f*d)$ where f is frequency, G(f) is frequency response of the transducer head 144 unrelated to head disk separation, and d is the head to disk separation. The Wallace Spacing Loss formula shows that the signal amplitude decreases exponentially at increasing frequencies and that the rate of exponential loss is proportional to the head to disk separation. If the separation between the head and disk changes in a drive, the signal amplitude changes inversely with the change in separation.

Figure 10:
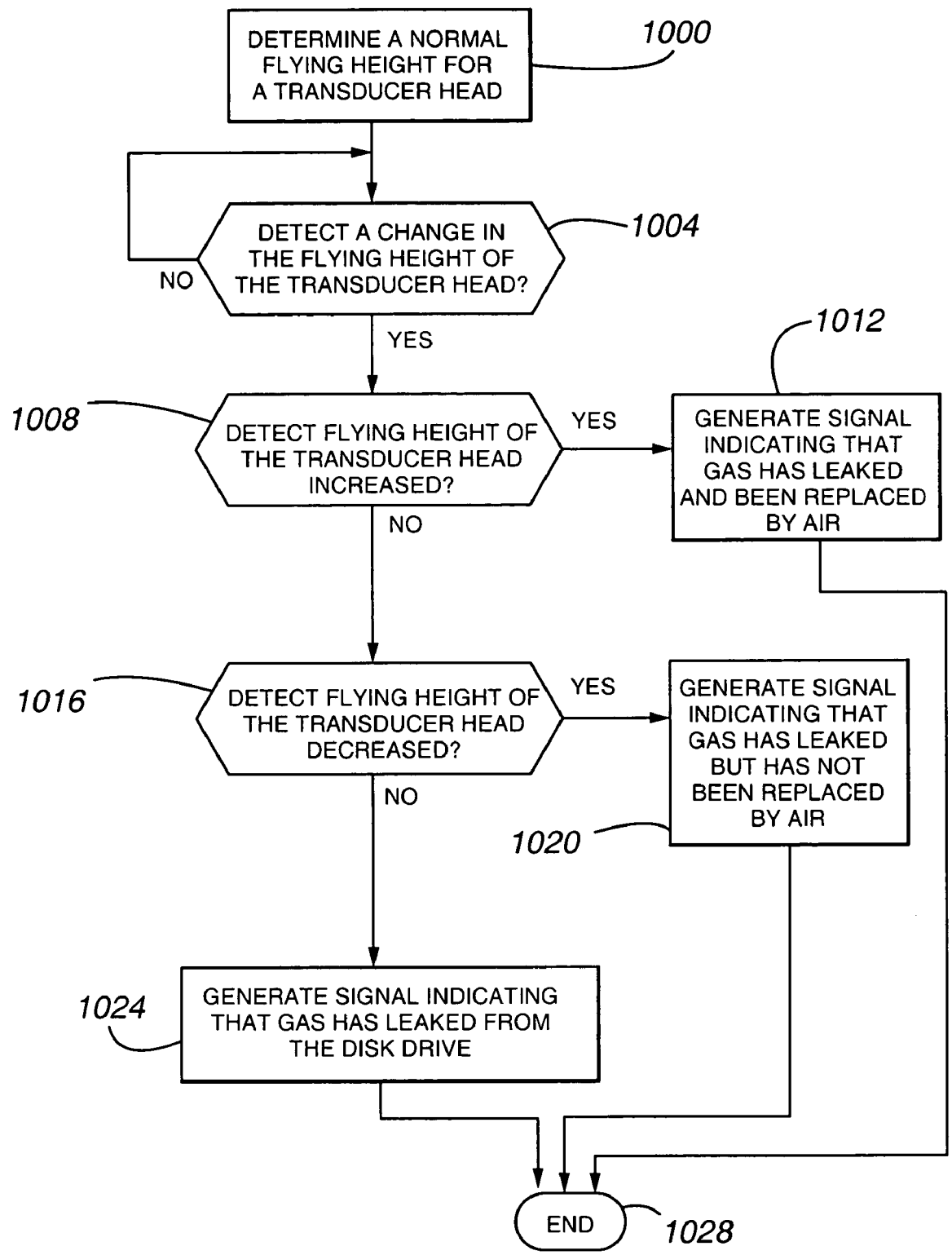
FIG. 10 is a flow chart depicting aspects of a method for detecting leaks in a hard disk drive in accordance with embodiments of the present invention.

With reference now to FIG. 10, aspects of a method for detecting leaks in a hard disk drive in accordance with embodiments of the present invention are illustrated. Initially, at step 1000, a normal flying height for a transducer head in a hard disk drive is determined. At step 1004, a determination is made as to whether a change in the flying height of the transducer head has been detected. If no change has been detected, the process may idle at step 1004.

If the change in the flying height of the transducer head is detected, a determination is made as to whether the flying height of the transducer head has increased (step 1008). If it is determined that the flying height of the transducer head has increased, a signal indicating that gas has leaked from the disk drive and been replaced by air is generated (step 1012).

If a determination that a flying height of the transducer head has not increased, a determination is made as to whether the flying height of the transducer head has decreased (step 1016). If the flying height of the transducer head has decreased, a signal indicating that gas has leaked from the disk drive but has not been replaced by air is generated (step 1020).

If it is not determined that the flying height of the transducer head has decreased, a signal indicating that gas has leaked from the disk drive, without indicating whether or not that gas has been replaced by air, is generated (step 1024). After generating a signal at any of steps 1012, 1020, or 1024, the process ends (step 1028).

Figure 11:
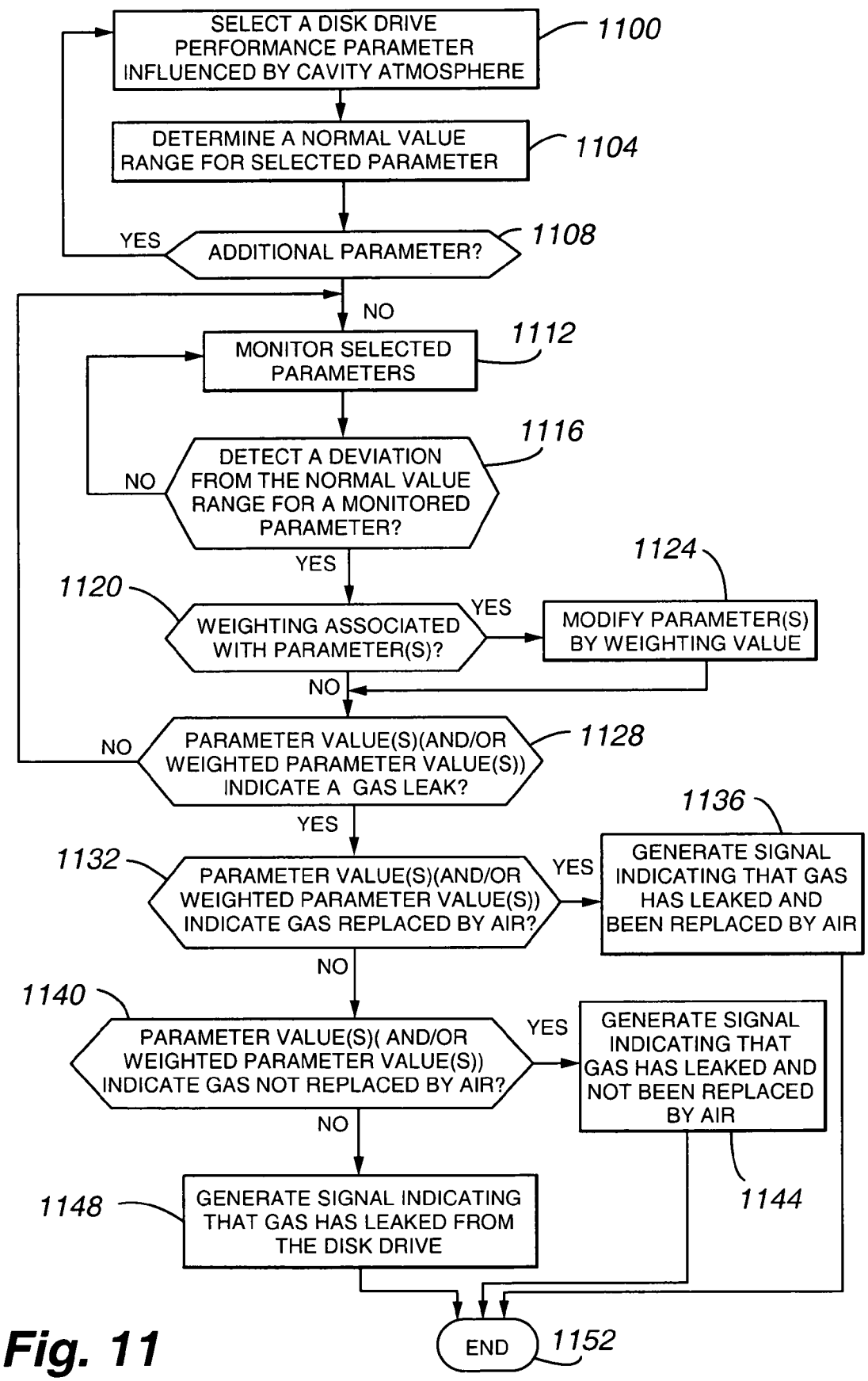
FIG. 11 is a flow chart illustrating aspects of a method for detecting leaks in a hard disk drive in accordance with other embodiments of the present invention.

With reference now to FIG. 11, aspects of a method for detecting leaks in a hard disk drive in accordance with other embodiments of the present invention are depicted. Initially, at step 1100, a disk drive performance parameter influenced by cavity atmosphere is selected for monitoring. At step 1104, a normal value for the selected parameter is determined. At step 1108, a determination is made as to whether an additional parameter is desired for monitoring. In general, by monitoring more than one parameter, the accuracy with which a determination as to whether gas is leaking from a disk drive can be made is increased. In addition, by monitoring more than one parameter, information regarding whether gas has leaked and been replaced by air or not can be made. In accordance with still other embodiments of the present invention, multiple instances of a parameter type within a single disk drive can be monitored simultaneously. For example, the flying heights of each transducer head included in a multiple head disk drive can be monitored. If an additional parameter is to be monitored, the process returns to step 1100. Accordingly, steps 1100, 1104 and 1108 may be repeated until all of the parameters to be monitored in a disk drive have been selected.

After a determination that no additional parameters are to be monitored, the process continues to step 1112, during which the selected parameters are monitored. That is, the selected parameters are monitored during operation of the disk drive. At step 1116, a determination is made as to whether a deviation from the normal value range for a monitored parameter has been detected. If no deviation from the normal value range for a monitored parameter is detected, the process may return to step 1112. Accordingly, it can be appreciated that the process may idle at steps 1112 and 1116 during normal operation of the disk drive.

If a deviation from the normal value range for a monitored parameter is detected, a determination is made as to whether a weighting is associated with the parameter or parameters found to have values outside of the normal range (step 1120). If a weighting is associated with a parameter, the parameter found to be outside of the normal value range is modified by the weighting value (step 1124). After modifying the parameters by any associated weighting value, or after determining that no weighting is associated with a parameter, a determination is made as to whether the parameter value or values (and/or the weighted parameter value or values) indicate a gas leak (step 1128). As can be appreciated by one of skill in the art, the determination as to whether a gas leak is indicated may be made with reference to the parameters that have values outside of their normal range, as modified by any weighting value, alone or in combination with values of other parameters, even if such parameters are within their normal ranges. Accordingly, a parameter that in a particular disk drive has been determined to have relatively low predictive value as to a gas leak may have a relatively low weighting, which may result in a determination that gas is not leaking from the drive when that parameter is considered in view of other monitored parameters. If a gas leak is not indicated, the process may return to step 1112, to continue monitoring the selected disk drive parameters.

If a gas leak is indicated, a determination is made as to whether the parameter value or values (and/or the weighted parameter value or values) indicate that the gas that had filled the drive has been replaced by air (step 1132). The determination as to whether gas has been replaced by air may be made with continued reference to the monitored disk drive parameters, modified by their weighting values if applicable. As can be appreciated from the description provided herein, the determination as to whether gas has leaked and been replaced by air may be made by considering only those parameters or values that have significance in connection with such a determination. In addition, embodiments of the present invention may apply a different weighting value in connection with monitored parameters in connection with determining whether gas has been replaced by air. If it is determined that gas has leaked and been replaced by air, a signal indicating that gas has leaked and been replaced by air is generated (step 1136).

If a determination that gas has leaked and been replaced by air is not made, a determination is made as to whether the parameter value or values (and/or weighted parameter value or values) indicate that gas has leaked and not been replaced by air (step 1140). As can be appreciated from the description provided herein, the determination as to whether gas has leaked and not been replaced by air can be made with reference to only those parameters that have significance in connection with such a determination. In addition, different weighting values may be applied to monitored parameters in connection with such a determination. Furthermore, it should be appreciated that the determinations described as occurring at steps 1132 and 1140 can be made in any order, and can be combined. If it is determined that gas has leaked and has not been replaced by air, a signal indicating that gas has leaked and not been replaced by air is generated (step 1144).

If it is not determined that gas has leaked and has not been replaced by air, a signal indicating that gas has leaked from the disk drive, without providing information as to whether that gas has been replaced by air or not, is generated (step 1148). After generating a signal in connection with a leak from the disk drive at steps 1136, 1144 or 1148, the process ends (step 1152).

Figure 12:
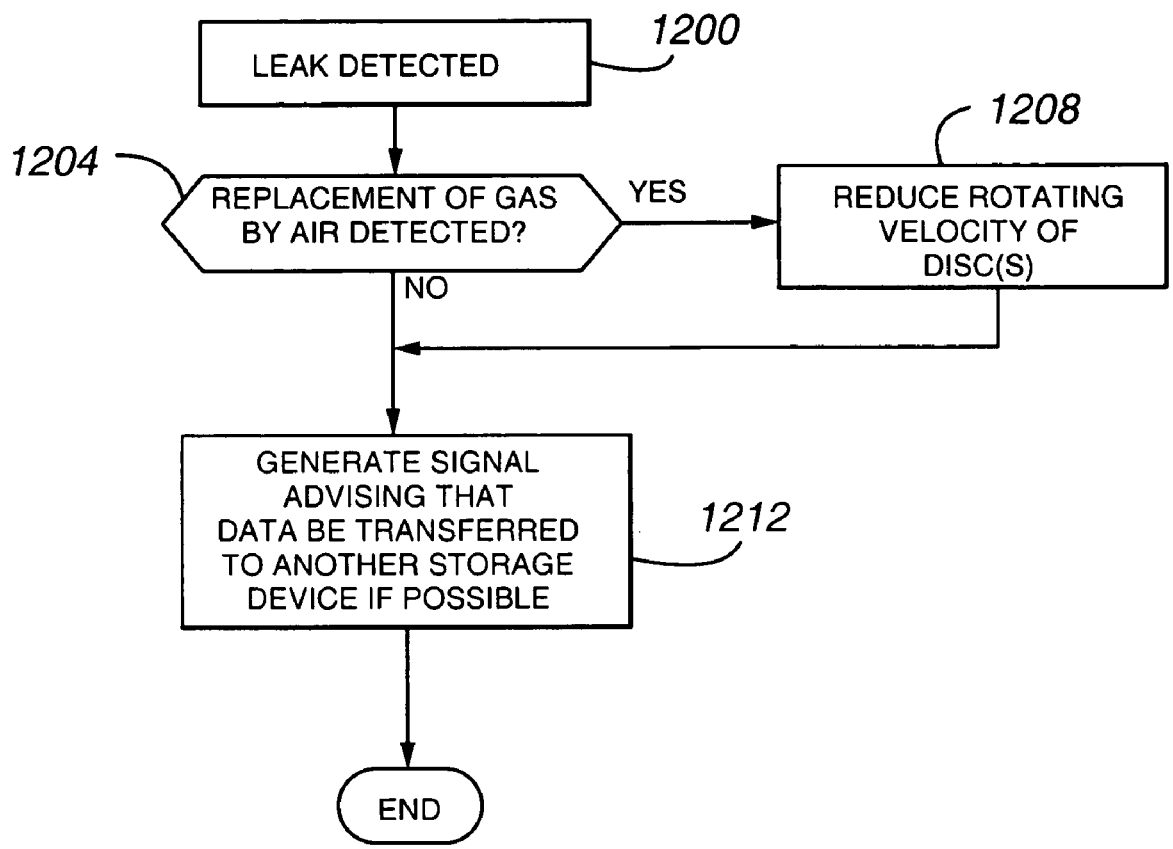
FIG. 12 is a flow chart illustrating aspects of a method for responding to leaks in a hard disk drive in accordance with embodiments of the present invention.

With reference now to FIG. 12, aspects of a method for responding to leaks detected in a disk drive in accordance with embodiments of the present invention are illustrated. Initially, at step 1200, a leak of gas from a monitored disk drive is detected. At step 1204, a determination is made as to whether a replacement of the gas by air has been detected. If a replacement of gas by air has been detected, the rotating velocity of the disks within the disk drive is reduced (step 1208). As can be appreciated by one of skill in the art, by reducing the rotating velocity of the disks, the flying height of the transducer heads will tend to decrease. Furthermore, because the reduction in velocity is taken in response to a replacement of light gas by air, it can be appreciated that the increased flying height that would typically be experienced by transducer heads as a result of having a light gas environment replaced by atmospheric air is counteracted. Accordingly, the transducer heads may continue to fly close enough to the surfaces of the disks that data may be read from the disks, albeit more slowly than during normal operation due to the decreased rotational velocity of the disk. In this way, an opportunity to read data from the drive that might otherwise have been lost is provided.

After not detecting a replacement of gas by air, or after the rotating velocity of the disks has been reduced, a signal advising that data be transferred to another storage device if possible is generated (step 1212). Accordingly, in response to detecting a leak of light gas from a disk drive, a user, administrator, or other authority can be notified that the monitored drive is in a failure mode. If the system associated with the drive is aware of alternate devices, the retrieval of data from the drive can be started automatically. Furthermore, it can be appreciated that by providing an early indication of a gas leak, the likelihood of successfully retrieving data from the disk drive is increased. For example, it is more likely that data can be retrieved before head crashes result in a permanent loss of data.

Although certain examples provided herein have discussed the use of Helium as a light or low density gas filling a disk drive to achieve performance advantages, the present invention is not so limited. Accordingly, embodiments of the invention described herein can be used to detect leaks of other gasses from a monitored disk drive.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for detecting a leak in a low density gas-filled hard disk drive, comprising:
   determining a normal flying height for at least a first transducer head of said hard disk drive;
   wherein said determining a normal flying height for said at least a first transducer head of said hard disk drive comprises determining at least first and second hard disk drive parameters associated with a normal flying height of said at least a first transducer head of said hard disk drive detecting a change in a flying height of said at least a first transducer head from said normal flying height, and wherein said detecting a change in said normal flying height of said at least a first transducer head comprises detecting a change in said at least first and second hard disk drive parameters; and
   generating a signal indicating that gas has leaked from said hard disk drive.

2. The method of claim 1, wherein said at least a first hard disk drive parameter comprises one of:
   a mean square error associated with said at least a first transducer head;
   a variable gain amplifier gain amount associated with said at least a first transducer head;
   a spindle motor power requirement;
   a spindle motor current requirement;
   a voice coil motor resistance;
   a temperature of a head disk assembly cavity;
   a temperature of a component located within a head disk assembly cavity of said hard disk drive;
   a temperature of a head disk assembly component not located within a head disk assembly cavity of said hard disk drive; and
   a fly-height sensor output.

3. The method of claim 2, wherein said at least a first hard disk drive parameter includes a temperature of a component located within a head disk assembly cavity of said hard disk drive, and wherein said component comprises a read/write channel preamplifier.

4. The method of claim 2, wherein said at least a first hard disk drive parameter comprises a fly-height sensor output, and wherein said fly-height sensor output comprises at least one of an output from at least one of a harmonic sensor, an automatic gain control amplitude signal, and a servo sector position burst amplitude.

5. The method of claim 1, wherein a plurality of hard disk drive parameters associated with a flying height of said at least a first transducer head of said hard disk drive are determined, and wherein said detecting a change in said normal flying height of said at least a first transducer head comprises detecting a change in at least one of said hard disk drive parameters.

6. The method of claim 1, wherein a plurality of hard disk drive parameters associated with a flying height of said at least a first transducer head of said hard disk drive are determined, and wherein said detecting a change in said normal flying height for said at least a first transducer head comprises detecting a change in a plurality of said hard disk drive parameters.

7. The method of claim 1, wherein said detected change in said at least first and second hard disk drive parameters indicates a decrease in said flying height of said at least a first transducer head, said detecting including detecting at least one of:
   a decrease in a mean square error rate associated with said transducer head;
   an decrease in a variable gain amplifier gain amount associated with said transducer head;
   a decrease in a spindle motor power requirement; and
   a harmonic fly-height sensor output.

8. The method of claim 1, wherein said detected change in said at least first and second hard disk drive parameters indicates an increase in said flying height of said at least a first transducer head, said detecting including detecting at least one of:
   an increase in a mean square error rate associated with said transducer head;
   an increase in a variable gain amplifier gain amount associated with said transducer head;
   an increase in a spindle motor power requirement;
   an increase in a spindle motor current requirement; and
   a fly-height sensor output.

9. The method of claim 1, wherein said generating a signal indicating a leak in said hard disk drive comprises generating a signal indicating a loss of said light gas without replacement by air.

10. The method of claim 9, wherein said generating a signal indicating a loss of said light gas without replacement by air is in response to detecting a decrease in a flying height of said at least a first transducer head from said normal flying height.

11. The method of claim 1, wherein said generating a signal indicating a leak in said hard disk drive comprises generating a signal indicating a leak and a replacement of said light gas with air.

12. The method of claim 11, wherein said generating a signal indicating a leak and a replacement of said light gas with air comprises detecting an increase in a flying height of said at least a first transducer head from said normal flying height.

13. The method of claim 12, further comprising:
   reducing a rotating velocity of a spindle motor of said hard disk drive, whereby a flying height of said at least a first transducer head is reduced.

14. The method of claim 1, wherein a normal flying height is determined for a plurality of transducer heads of said hard disk drive.

15. The method of claim 14, further comprising detecting a change in a flying height of a number of said transducer heads from a normal flying height for each of said transducer heads.

16. A method for detecting leaks in a low density gas-filled hard disk drive, comprising:
   monitoring at least a first hard disk drive performance parameter, said at least a first hard disk drive performance parameter including a temperature of a head disk assembly; and
   generating a signal indicating a leak in said hard disk drive in response to detecting a change in said at least a first hard disk drive performance parameter as a result of said monitoring.

17. The method of claim 16, wherein said monitoring comprises monitoring a plurality of hard disk drive performance parameters, at least one of said plurality of hard disk drive performance parameters corresponding to said first hard disk drive performance parameter.

18. The method of claim 17, wherein said generating a signal indicating a leak in said hard disk drive comprises detecting a change in a number of said monitored hard disk drive performance parameters.

19. The method of claim 18, wherein a weighting is applied to at least some of said hard disk drive performance parameters.

20. The method of claim 16, wherein said monitoring comprises monitoring a second hard disk drive performance parameter, said second hard disk drive performance parameter including one of:
a quality function associated with a transducer head;
a variable gain amplifier gain amount;
a spindle motor power requirement;
a temperature of a head disk assembly;
a head disk assembly cavity temperature;
a harmonic sensor indication that a fly height of a transducer head has changed;
a servo sector position burst signal amplitude indication that a fly height of a transducer head has changed; and
a mean square error rate of a transducer head;
a variable gain amplifier gain amount;
a spindle motor power requirement;
a temperature of a head-disk assembly component;
a voice coil motor resistance;
a harmonic sensor indication that a fly height of a transducer head has changed; and
a servo sector position burst signal amplitude indication that a fly height of a transducer head has changed.

21. The method of claim 20, wherein said generating a signal indicating a leak in said hard drive is performed in response to a change in said first hard disk drive performance parameter and a second hard disk drive parameter.

22. The method of claim 16, wherein said monitoring a temperature of a head disk assembly comprises monitoring a temperature of a head disk assembly component.

23. The method of claim 16, wherein said at least a first hard disk drive parameter comprises a head assembly flying height, and wherein monitoring said flying height comprises at least one of monitoring a quality function of said hard disk drive, monitoring a gain of a variable gain amplifier, monitoring a harmonic sensor output, and monitoring a servo sector position burst signal amplitude.

24. The method of claim 16, wherein said monitoring at least a first hard disk drive parameter includes monitoring a quality function of a transducer head, and wherein said quality function of said transducer head comprises at least one of a mean square error and a sequence amplitude margin associated with said transducer head.

25. The method of claim 23, wherein a head assembly flying height of a number of head assemblies included in said hard disk drive are monitored.

26. The method of claim 16, further comprising:
detecting replacement of a low density gas in a head disk assembly of said hard disk drive by air; and
reducing a rotating velocity of a spindle motor of said hard disk drive.

27. A low density gas-filled hard disk drive, comprising:
a base;
a top cover;
a head disk assembly cavity defined substantially by said base and said top cover;
a data storage disk rotatably interconnected to said base by a spindle motor bearing;
a spindle motor operable to rotate said data storage disk relative to said base;
a head suspension assembly, including:
an actuator arm movably interconnected to said base;
a transducer head interconnected to said actuator arm, said transducer head located adjacent a surface of said data storage disk wherein said transducer head is operable to read information from and write information to said surface of said data storage disk, said transducer head; and
a controller, wherein a number of parameters of said disk drive are monitored, and wherein a change in at least two of said parameters causes a signal indicating a loss of gas from said interior cavity to be generated.

28. The hard disk drive of claim 27, further comprising:
a temperature sensor, wherein a temperature sensor signal related to a temperature of said head disk assembly cavity is available to said controller.

29. The hard disk drive of claim 27, further comprising:
a channel preamplifier located within said head disk assembly cavity, wherein said channel preamplifier is operable to amplify a signal passed along a channel interconnected said transducer head; and
a temperature sensor, wherein a temperature sensor signal related to a temperature of said preamplifier is available to said controller.

30. The hard disk drive of claim 27, further comprising:
a temperature sensor, wherein a sensor signal related to a head disk assembly component temperature is available to said controller.

31. The hard disk drive of claim 27, further comprising:
a variable gain amplifier, wherein a signal indicating a gain amount of said variable gain amplifier operable to amplify a signal derived from said data storage disk by said transducer head is available to said controller.

32. The hard disk drive of claim 31, wherein said gain amount of said variable gain amplifier is dependent on an amplitude of a signal derived from at least one of an automatic gain control field and a servo sector position burst.

33. The hard disk drive of claim 27, further comprising:
a harmonic sensor, wherein a signal indicating a flying height of said transducer head over said disk is provided to said controller by said harmonic sensor.

34. The hard disk drive of claim 27, further comprising:
a voice coil motor operable to actuate said head suspension assembly, wherein a resistance of said voice coil motor is available to said controller, and wherein one of said monitored parameters comprises said resistance of said voice coil motor.

35. The hard disk drive of claim 27, wherein said head disk assembly cavity is filled with a low density gas.

36. The hard disk drive of claim 35, wherein said low density gas is a gas having a density that is less than the density of air.

37. A disk drive, comprising:
means for enclosing components of said hard disk drive, said means for enclosing defining a cavity;
means for storing data located within said cavity and rotatable relative to said means for enclosing;
means for reading data from said means for storing data, said means for reading data having a nominal flying height with respect to said means for storing data when said disk drive is in a first mode of operation;
means for reducing aerodynamic drag and turbulence at an interface between said means for storing data and said means for reading data located within said cavity;
means for detecting a change in a number of disk drive parameters related to an amount of said means for reducing aerodynamic drag and turbulence located within said cavity; and means for generating a signal indicating a loss of at least some of said means for reducing aerodynamic drag and turbulence from said cavity.

38. The disk drive of claim 37, further comprising:

means for amplifying a read signal;

means for carrying said read signal from said means for reading data to said means for amplifying;

means for determining a temperature of said means for amplifying, wherein an output of said means for determining a temperature of said means for amplifying is provided to said means for detecting a change in a number of disk drive parameters.

39. The disk drive of claim 37, further comprising:

means for determining a temperature in an interior of said cavity, wherein an output of said means for determining a temperature in an interior of said cavity is provided to said means for detecting a change in a number of disk drive parameters.

40. The disk drive of claim 37, further comprising:

means for determining a temperature of a head disk assembly component.

41. The disk drive of claim 37, wherein said means for detecting a change in a flying height of said transducer head comprises harmonic sensor means.

42. The disk drive of claim 37, wherein said means for reading data from said means for storing data also comprises means for writing data to said means for storing data.

43. The disk drive of claim 37, wherein said means for reducing aerodynamic drag and turbulence is a low density gas.

* * * * *